(12) United States Patent
Mualem et al.

(10) Patent No.: US 8,701,183 B2
(45) Date of Patent: Apr. 15, 2014

(54) HARDWARE-BASED HUMAN PRESENCE DETECTION

(75) Inventors: Avraham Mualem, Jerusalem (IL); Eli Kupermann, Maale Adumim (IL)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 12/894,919

(22) Filed: Sep. 30, 2010

(65) Prior Publication Data

US 2012/0084854 A1    Apr. 5, 2012

(51) Int. Cl.
  *G06F 21/00* (2013.01)
  *G06F 21/36* (2013.01)

(52) U.S. Cl.
  CPC ........ *G06F 21/36* (2013.01); *G06F 2221/2133* (2013.01)
  USPC .......... 726/18; 726/19; 726/17; 726/2; 726/7; 726/23; 705/44; 705/51

(58) Field of Classification Search
  USPC ............... 726/2, 7, 16–19, 23; 705/44, 51
  See application file for complete search history.

(56) References Cited

U.S. PATENT DOCUMENTS

| 7,565,330 | B2 | 7/2009 | Steeves et al. | |
|---|---|---|---|---|
| 2007/0192849 | A1* | 8/2007 | Golle et al. | 726/16 |
| 2009/0138723 | A1 | 5/2009 | Nyang et al. | |
| 2009/0150983 | A1* | 6/2009 | Saxena et al. | 726/7 |
| 2009/0292924 | A1* | 11/2009 | Johnson et al. | 713/176 |
| 2009/0328163 | A1 | 12/2009 | Preece | |
| 2010/0037319 | A1* | 2/2010 | Steeves et al. | 726/23 |
| 2010/0161927 | A1 | 6/2010 | Sprouse et al. | |
| 2010/0328074 | A1* | 12/2010 | Johnson et al. | 340/573.1 |
| 2011/0151836 | A1* | 6/2011 | Dadu et al. | 455/411 |

FOREIGN PATENT DOCUMENTS

| WO | 2012/044996 A2 | 4/2012 |
|---|---|---|
| WO | 2012/044996 A3 | 6/2012 |

OTHER PUBLICATIONS

International Search Report and Written Opinion received for PCT Patent Application No. PCT/US2011/054330, mailed on Apr. 10. 2012, 9 pages.
International Preliminary Report on Patentability mailed Apr. 11, 2013 for International Application No. PCT/US2011/054330, 7 pages.

* cited by examiner

*Primary Examiner* — Andrew L Nalven
*Assistant Examiner* — Amir Mehrmanesh
(74) *Attorney, Agent, or Firm* — Schwabe, Williamson & Wyatt, P.C.

(57) ABSTRACT

A method, system, and computer program product containing instructions to provide hardware-based human presence detection. Rather than rely upon software to display a CAPTCHA image, hardware in the form of a sprite engine of a graphics device is used to write a random text string directly to the display device, overlaying the user interface provided by software. Because the sprite engine is isolated from a host operating system for the system, the random text string cannot be captured and processed by software robots running under the host operating system.

12 Claims, 3 Drawing Sheets

HARDWARE-BASED HUMAN PRESENCE DETECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to human presence detection for computer user interfaces.

BACKGROUND

A CAPTCHA or Captcha is a type of challenge-response test used in computing to ensure that the response is not generated by a computer. The CAPTCHA process usually involves one computer (a server) asking a user to complete a simple test which the computer is able to generate and grade. Because other computers are unable to solve the CAPTCHA, any user entering a correct solution is presumed to be human. Thus, it is sometimes described as a reverse Turing test, because it is administered by a machine and targeted to a human, in contrast to the standard Turing test that is typically administered by a human and targeted to a machine. A common type of CAPTCHA requires that the user type letters or digits from a distorted image that appears on the screen. Example CAPTCHAs are shown in FIGS. 1A, 1B, and 1C.

The term "CAPTCHA" (based upon the word capture) was coined in 2000 by Luis von Ahn, Manuel Blum, Nicholas J. Hopper, and John Langford (all of Carnegie Mellon University). CAPTCHA is a contrived acronym for "Completely Automated Public Turing test to tell Computers and Humans Apart."

CAPTCHAs are used to prevent automated software from performing actions which degrade the quality of service of a given system, whether due to abuse or resource expenditure. CAPTCHAs can be deployed to protect systems vulnerable to e-mail spam, such as the webmail services of Gmail, Hotmail, and Yahoo! Mail. CAPTCHAs are also used to stop automated posting to blogs, forums and wikis, whether as a result of commercial promotion, or harassment and vandalism.

DETAILED DESCRIPTION

Figure 1A:
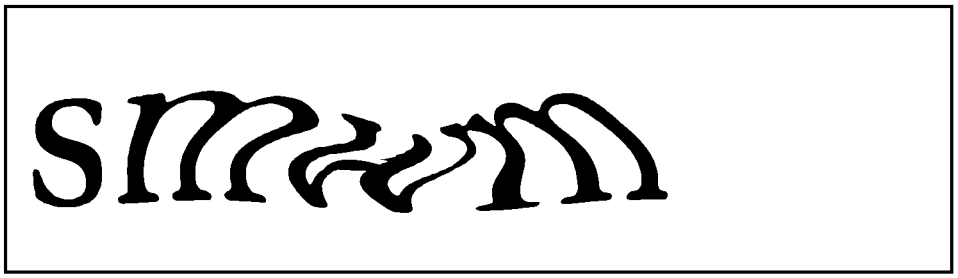
FIGS. 1A, 1B, and 1C are examples of display screens showing CAPTCHA images.
Figure 1B:
Figure 1C:
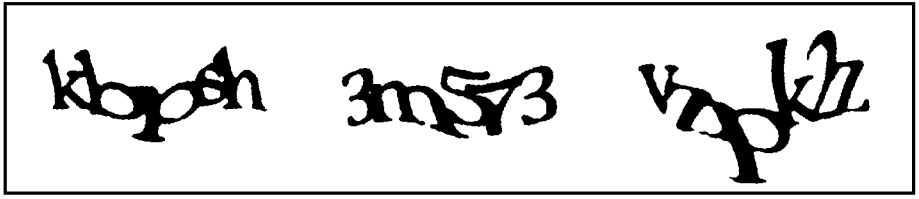

FIGS. 1A, 1B, and 1C are examples of display screens showing CAPTCHA images. FIG. 1A shows an early form of a CAPTCHA image that is no longer used because algorithms to automatically read the distorted image have been developed. FIG. 1B, with an angled line through the text to make segmentation of the text into letters more difficult for automated programs, is one form of CAPTCHA image that is currently in use, although human readability is lessened. Similarly, FIG. 1C, with overlapping warped characters, is another type of CAPTCHA image designed to inhibit automated reading of the text, although this example is also more difficult for humans to read. This example also presents an ambiguous challenge, as the leftmost image could be read as either the text string "kbpsh" or "klopsh." As CAPTCHA-breaking algorithms become increasingly sophisticated, CAPTCHA images have become increasingly difficult for humans to read.

Described herein are a method, system, and computer program product for providing hardware-based human presence detection. Rather than rely upon software to display a CAPTCHA image, hardware in the form of a sprite engine of a graphics device is used to write a random text string directly to the display device. Because the sprite engine is isolated from a host operating system for the system, the random text string cannot be captured and processed by software robots running under the host operating system.

In one embodiment, a method comprises providing a random text string to a sprite engine of a graphics device of a system, wherein the sprite engine is isolated from a host operating system for the system; writing the random text string directly to a display device by the sprite engine; receiving a response to display of the random text string; and determining that a human user is using the system if the response matches the random text string. The method may further comprise generating the random text string in a secure partition isolated from the host operating system. In one embodiment, writing the random text string directly to a display device by the sprite engine may comprise writing the random text string overlaying a user interface provided by the host operating system. In one embodiment, writing the random text string directly to a display device by the sprite engine may comprise writing the random text string in clear text format. In one embodiment, providing the random text string to the sprite engine comprises providing the random text string to the sprite engine over an interconnection that is isolated from the host operating system.

Figure 2:
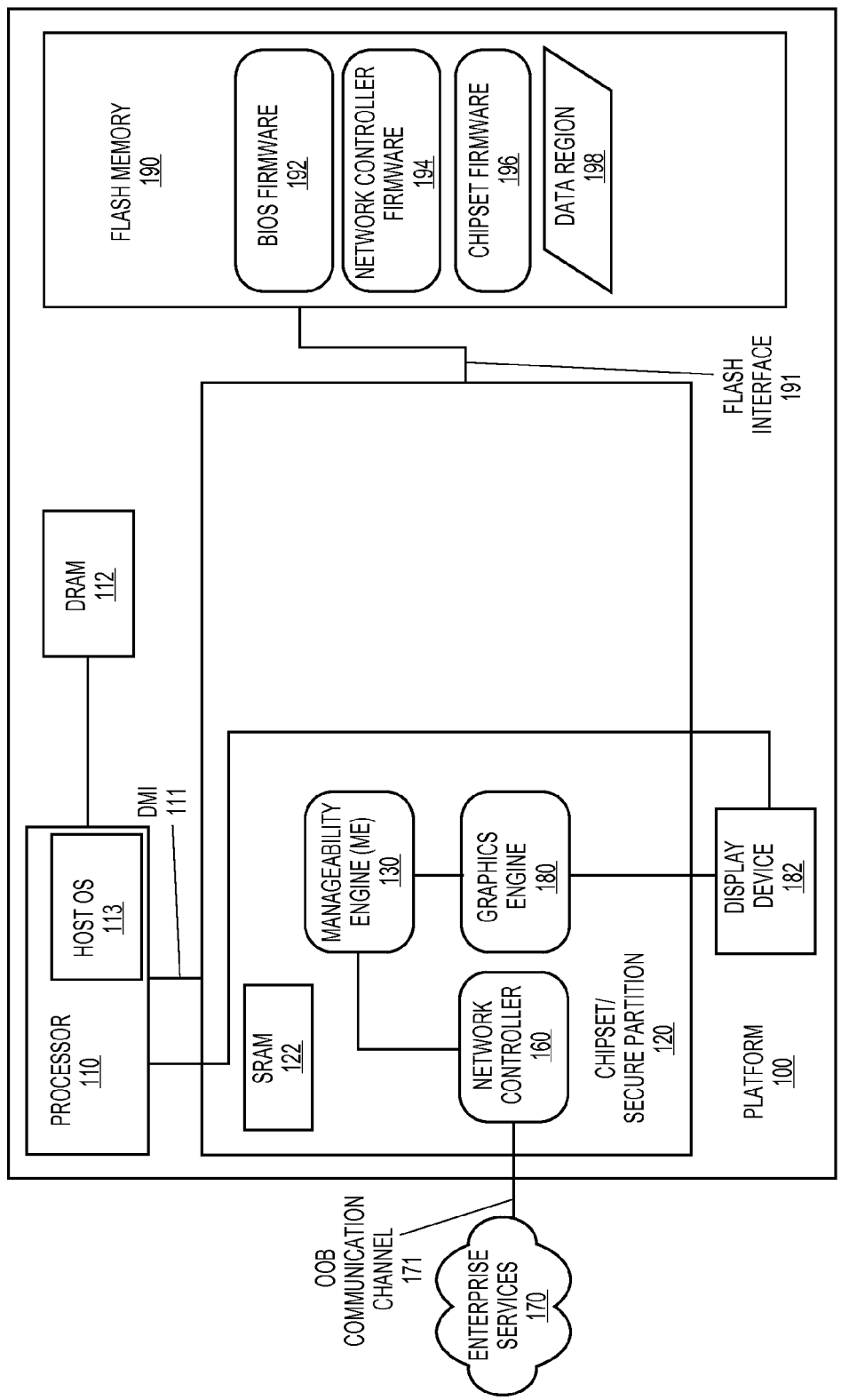
FIG. 2 is a block diagram depicting a suitable data processing environment in which certain aspects of an example embodiment of hardware-based human presence detection may be implemented.

FIG. 2 is a block diagram depicting a suitable data processing environment 10 in which certain aspects of an example embodiment of hardware-based human presence detection may be implemented. Data processing environment 10 includes a processing system 100 that includes one or more processors or central processing units (CPUs), shown here as processor 110. One of skill in the art will recognize that, while only one processor is shown, a single processor or any number of multiple processors may provide processor functionality to processing system 100. Processor 110 may be a single-core or a multi-core processor. Processor 110 is shown as communicatively coupled to various other components including a memory 112 via one or more system buses or other communication pathways or mediums.

Processing system 100 may be controlled, at least in part, by input from conventional input devices, such as keyboards, mice, etc., and/or by directives received from another machine, biometric feedback, or other input sources or signals. Processing system 100 may provide output via a display device 182. Processing system 100 may utilize one or more connections to one or more remote data processing systems (not shown) in data processing environment 10, such through a network interface controller (NIC) such as network controller 160, a modem, or other communication ports or couplings. Processing system 100 may be interconnected to such remote data processing systems by way of a physical and/or logical network (not shown), such as a local area network (LAN), a wide area network (WAN), an intranet, the Internet, etc. Communications involving the network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Processor 110 is connected to a chipset 120 via desktop management interface (DMI) 111. Chipset 120 includes a manageability engine (ME) 130, which may be implemented as an embedded microprocessor that operates independently of processor 110, to manage the configuration and operation of platform 100. In one embodiment, processor 110 operates under the direction of a host operating system 113, whereas manageability engine (ME) 130 provides a secure and isolated environment that cannot be accessed by the host operating system 113. In one embodiment, manageability engine (ME) 130 authenticates users, controls access to peripheral devices, manages encryption keys for protection of data stored on storage devices of system 100, and provides an interface to enterprise services 170 via network controller 160. Communication between ME 130 and enterprise services 170 occurs via out-of-band communication channel 171.

Manageability engine (ME) 130 is also connected to graphics engine 180, which in the embodiment shown resides inside chipset/secure partition 120. Because ME 130 and graphics engine 180 both reside within chipset/secure partition 120, communication between ME 130 and graphics engine 180 is isolated from the host operating system 113. A direct interconnection between ME 130 and graphics engine 180 is used for communication, and by virtue of being within the chipset, is isolated from the host operating system 113.

One of skill in the art will recognize that graphics engine 180 may alternatively reside within processor 110 or outside both processor 110 and chipset 120. In such embodiments, communication between ME 130 and graphics engine 180 is also isolated from host operating system 113. This isolation may be accomplished, for example, by allocating different portions of memory as part of the address space for processor 110 and graphics engine 180 during system initialization. The portions of memory allocated to graphics engine 180 therefore are not visible to host operating system 113 running on processor 110. Alternatively, isolation from host operating system 113 may be accomplished by providing a direct hardware interconnection between ME 130 and graphics engine 180.

System 100 further includes memory devices such as dynamic random access memory (DRAM) 112, static random access memory (SRAM) 122 within chipset 120, and flash memory 190. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 152 may include mass storage devices such as integrated drive electronics (IDE) hard drives, and/or other devices or media, such as floppy disks, optical storage, tapes, flash memory, memory sticks, digital video disks, biological storage, etc.

Flash memory 190 is accessible by chipset 120 via flash interface 191. Flash memory 190 contains firmware used to initialize system 100. This initialization firmware includes Basic Input/Output System (BIOS) firmware 192 to identify and initialize system component hardware (such as the video display card and hard disk) and some other hardware devices including manageability engine (ME) 130. BIOS firmware 192 prepares system component hardware of system 100 to operate in a known low capability state, so other software programs stored on various media, including an operating system, can be loaded, executed, and given control of platform 100.

Flash memory 190 also includes network controller firmware 194 to configure network controller 160, and chipset firmware 196 to configure chipset 120. Flash memory 190 also contains a data region 198. In one embodiment, data region 198 is encrypted and may only be read by manageability engine (ME) 130.

Processor 110 may also be communicatively coupled to additional components, such as video controllers, small computer system interface (SCSI) controllers, network controllers, storage controllers, universal serial bus (USB) controllers, input devices such as a keyboard and mouse, etc. System 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 160 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Figure 3:
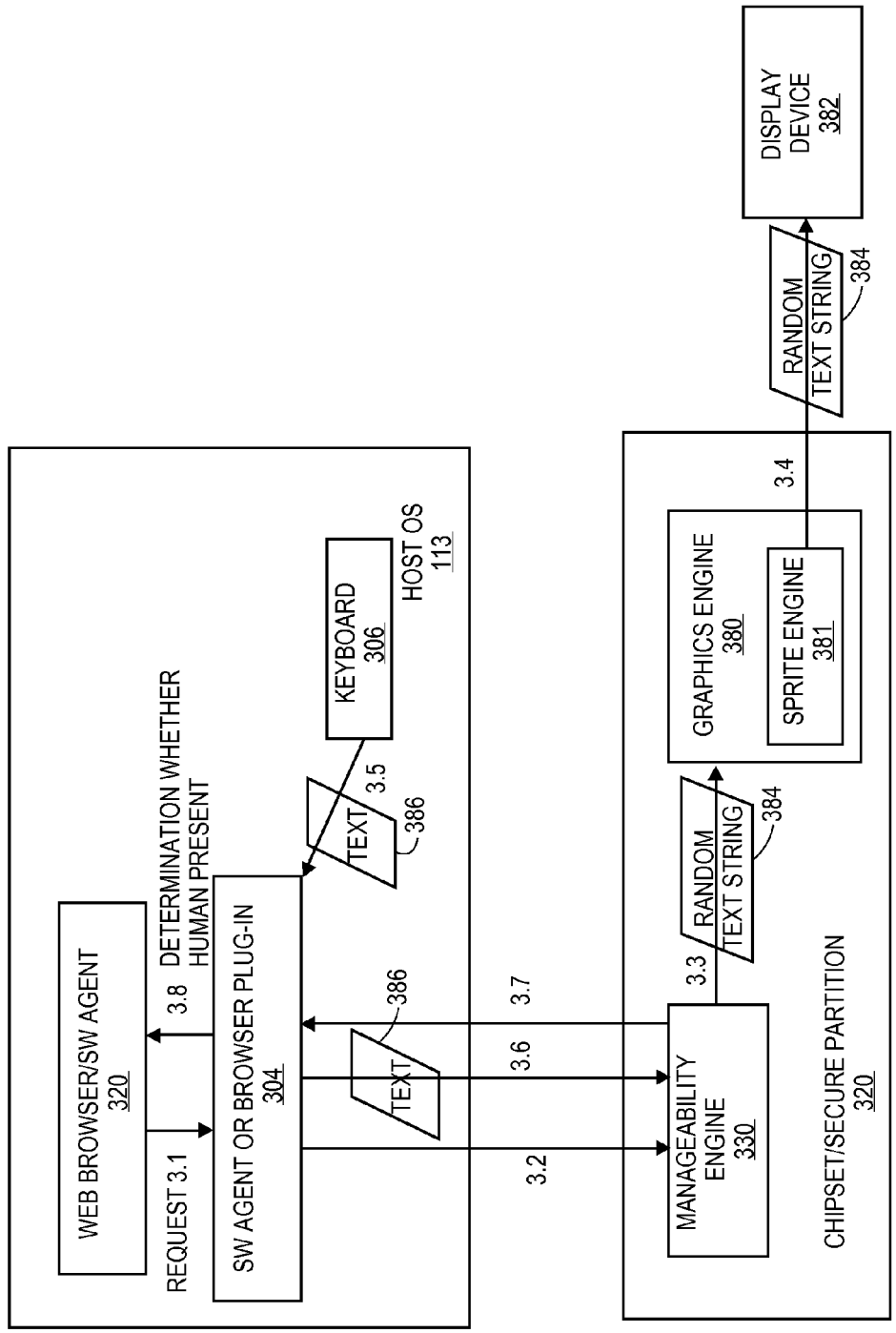
FIG. 3 is a diagram showing information flows for hardware-based human presence detection in accordance with one embodiment of the invention.

FIG. 3 is a diagram showing information flows for hardware-based human presence detection in accordance with one embodiment of the invention. In action 3.1, web browser/software agent 302 identifies the need to detect human presence and sends a request to software agent/browser plug-in 304. Web browser/software agent 302 and software agent/browser plug-in 304 operate in the environment provided by host operating system 113. In action 3.2, software agent/browser plug-in 304 communicates with manageability engine 330 within chipset/secure partition 320 to request to display a secure output window for performing human presence detection. Because chipset/secure partition 320 is isolated from the environment provided by host operating system 113, the actions of manageability engine 330 and graphics engine 380 are isolated from software robots running in the host operating system 113 environment.

In response to the request from software agent/browser plug-in 304, manageability engine 330 generates a random text string 384 and, in action 3.3, provides random text string 384 to graphics engine 380. Random text string 384 is provided via a secure interconnection between manageability engine 330 and graphics engine 380 that is isolated from host operating system 113.

In action 3.4, graphics engine 380 uses sprite engine 381 to display random text string 384 securely on display device 382. In one embodiment, sprite engine 380 uses an overlay mechanism to display the random text string overlaying a user interface being provided on the display device 382 by software running under host operating system 113. This overlay mechanism is provided directly by the sprite engine 381 hardware and the information displayed cannot be captured by software robots running under host operating system 113. The user of the system reads the random text string 384 and types in text 386 corresponding to the random text string using keyboard 306.

In action 3.5, software agent/browser plug-in 304 captures text 386 typed by the user using keyboard 306. In action 3.6, software agent/browser plug-in 304 sends the captured text 386 to manageability engine 330 to be verified. In action 3.7, manageability engine compares text 386 to random text string 384. If text 386 matches random text string 384, manageability engine 330 determines that a human user entered the text 386, verifying human presence. If text 386 does not match random text string 384, manageability engine 330 determines that a human is not present. In action 3.8, software agent/browser plug-in 304 returns the human presence determination to web browser/software agent 302.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing human presence detection services. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
generating, by a manageability engine of a computing device, a random text string, wherein the manageability engine is located in a secure partition on the computing device, and the secure partition is isolated from a host operating system of the computing device;
providing, by the manageability engine, the random text string to a sprite engine of a graphics engine of the secure partition;
writing, by the sprite engine, the random text string directly to a display device of the computing device, outside the secure partition, to display the random text string;
receiving, by the manageability engine, a response to the display of the random text string; and
determining, by the manageability engine, that a human user is using the computing device if the response matches the random text string.

2. The method of claim 1 wherein writing the random text string directly to a display device comprises overlaying, by the sprite engine, the random text string on a user interface provided by the host operating system such that the random text string is unable to be captured by a software robot executing under the host operating system.

3. The method of claim 1 wherein writing the random text string directly to a display device by comprises writing the random text string in clear text format.

4. The method of claim 1 wherein providing the random text string to the sprite engine comprises providing the random text string to the sprite engine over an interconnection contained within the secure partition.

5. A computing device comprising:
at least one processor configured to execute at least a host operating system;
a graphics engine, that includes a sprite engine, coupled with the at least one processor, wherein the graphics engine is located in a secure partition and the secure partition is isolated from the host operating system;
a display device coupled with the graphics engine and the at least one processor; and
a manageability engine, located in the secure partition, coupled with the graphics engine and the at least one processor, configured to:
generate a random text string;
provide the random text string to the sprite engine to enable the sprite engine to write the random text string directly to the display device to display the random text string;
receive a response to display of the random text string; and
determine that a human user is using the computing device if the response matches the random text string.

6. The computing device of claim 5, wherein the sprite engine is configured to overlay the random text string on a user interface provided by the host operating system such that the random text string is unable to be captured by a software robot executing under the host operating system.

7. The computing device of claim 5, wherein the sprite engine is configured to write the random text string in clear text format.

8. The computing device of claim 5, wherein the manageability engine is coupled to the graphics engine by an interconnection contained within the secure partition.

9. A computer program product comprising:
    one or more non-transitory computer-readable storage media; and
    instructions stored on the one or more computer-readable storage media, wherein the instructions, when executed in a secure partition of a computing device that is isolated from a host operating system of the computing device, cause the computing device to operate a manageability engine in the secure partition to:
    generate a random text string in the secure partition;
    provide the random text string to a sprite engine of a graphics engine of the secure partition,
    wherein the sprite engine, in response, writes the random text string directly to a display device of the computing device;
    receive a response to display of the random text string; and
    determine that a human user is using the computing device if the response matches the random text string.

10. The computer program product of claim 9, wherein the sprite engine writes the random text string to overlay the random text string on a user interface provided by the host operating system such that the random text string is unable to be captured by a software robot executing under the host operating system.

11. The computer program product of claim 9, wherein the sprite engine writes the random text string to write the random text string in clear text format.

12. The computer program product of claim 9, wherein provide comprises provision of the random text string to the sprite engine over an interconnection contained within the secure partition.

\* \* \* \* \*